United States Patent
Li et al.

(10) Patent No.: US 7,449,667 B2
(45) Date of Patent: *Nov. 11, 2008

(54) ILLUMINATION METHOD AND APPARATUS HAVING A PLURALITY OF FEEDBACK CONTROL CIRCUIT FOR CONTROLLING INTENSITIES OF MULTIPLE LIGHT SOURCES

(75) Inventors: Zili Li, Barrington, IL (US); Tomasz L. Klosowiak, Glenview, IL (US); Min-Xian M. Zhang, Inverness, IL (US)

(73) Assignee: Motorola, Inc., Schaumburg, IL (US)

( * ) Notice: Subject to any disclaimer, the term of this patent is extended or adjusted under 35 U.S.C. 154(b) by 257 days.

This patent is subject to a terminal disclaimer.

(21) Appl. No.: 11/275,206

(22) Filed: Dec. 19, 2005

(65) Prior Publication Data
US 2007/0152129 A1     Jul. 5, 2007

(51) Int. Cl.
*G01J 1/32* (2006.01)
(52) U.S. Cl. ............................................. 250/205
(58) Field of Classification Search ................ 250/205, 250/214 R, 216, 214 D; 362/16, 18; 359/242, 359/292; 358/475; 356/399–402; 355/35, 355/83; 385/5
See application file for complete search history.

(56) References Cited

U.S. PATENT DOCUMENTS

| | | | |
|---|---|---|---|
| 3,624,278 A | 11/1971 | Heckscher | |
| 4,733,067 A | 3/1988 | Oinoue et al. | |
| 5,115,305 A * | 5/1992 | Baur et al. | 348/751 |
| 5,822,501 A | 10/1998 | Hattori | |
| 5,953,294 A | 9/1999 | Choi | |
| 6,614,954 B2 | 9/2003 | Huang et al. | |
| 2001/0055462 A1 | 12/2001 | Seibel | |
| 2003/0011751 A1 | 1/2003 | Sakata et al. | |
| 2003/0044967 A1 | 3/2003 | Heffelfinger et al. | |
| 2003/0058440 A1 | 3/2003 | Scott et al. | |
| 2003/0117483 A1 | 6/2003 | Ishikawa et al. | |
| 2004/0218643 A1 | 11/2004 | Wickman et al. | |
| 2005/0219674 A1 | 10/2005 | Asai et al. | |
| 2005/0247683 A1 | 11/2005 | Agarwal et al. | |
| 2005/0251692 A1 | 11/2005 | Motoyama et al. | |

OTHER PUBLICATIONS

Closing in on the Perfect Code, Erico Guizzo, IEEE Spectrum, vol. 41, Issue 3, (Mar. 2004), pp. 36-42.

* cited by examiner

*Primary Examiner*—Que T Le

(57) ABSTRACT

Light from a plurality of light sources is combined in a beam combiner. Photo-sensors are used to sense the intensity of each light source. Signals from the photo-sensors may be used to control the intensity of the light sources. The photo-sensors can be located in the beam combiner or located in the fringe of a collimated beam produced by the beam combiner. The illumination system has application in laser-scanning micro-projectors, for example.

21 Claims, 4 Drawing Sheets

ILLUMINATION METHOD AND APPARATUS HAVING A PLURALITY OF FEEDBACK CONTROL CIRCUIT FOR CONTROLLING INTENSITIES OF MULTIPLE LIGHT SOURCES

CROSS REFERENCE TO RELATED APPLICATIONS

This application is related to application CML02741T, U.S. patent application Ser. No. 11/275,204, entitled Method and Apparatus for Intensity Control of Multiple Light Sources Using Source Timing and which is filed even date herewith.

BACKGROUND

An ultra-compact projection display, called a micro-projector, can provide an image larger than the hosting projecting device dimension. Such displays have the potential to overcome the display size limitation on mobile devices and can be used to display documents and images, for example. The displays can also help to overcome the input interface size limitation on mobile devices by displaying virtual input devices, such as keyboards.

One technology used for micro-projection is laser scanning, in which red, green and blue lasers are scanned across a surface to form a full color image.

It is known that an individual semi-conductor laser requires dynamic intensity stability control, which is usually performed by monitoring the laser output with a photo-diode and using a feedback control loop to control the laser intensity.

When micro-projection is used in a mobile device, the environmental conditions, such as temperature, will be subject to large changes. These changes increase the need for intensity control.

In a full color micro-projector, the laser sources are very close together and some techniques used for feedback control of a single laser may be ineffective due to cross-talk between the lasers. For example, one prior approach is to monitor the main beam reflection in the system, either from the housing or from the lens, to provide a feedback signal. Another approach is to measure leakage from a back mirror of the cavity. However, this is not a direct measure of laser power and reduces laser efficiency. Neither of these approaches will work when multiple lasers are used, because they do not provide feedback for the individual lasers or they result in increased overall size of the system.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION

Figure 1:
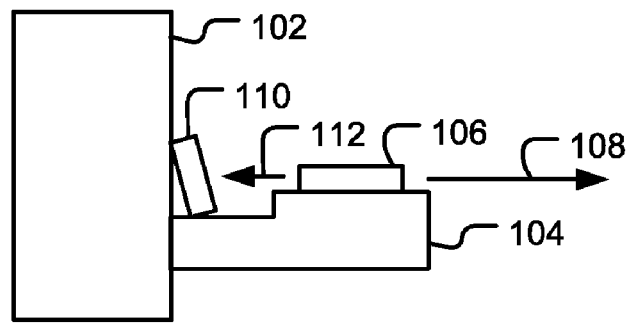
FIG. 1 is single laser with intensity control of the prior art.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

The present invention relates to intensity control in an illumination system employing multiple light sources. The invention is described with reference to an embodiment in a full color micro-projection system using laser light sources. However, other embodiments will be apparent to those of ordinary skill in the art.

FIG. 1 is single laser with intensity control of the prior art. The laser 100 includes a support structure 102, which is coupled to body 104 and supports semi-conductor laser element 106. The laser element emits light 108 in the forward direction. A photo-diode 110 collects light 112 that is emitted through a back mirror of laser element 106 or reflected by the metal case. This reduces efficiency because of leakage through the back mirror, and results in increased threshold current and decreased slope efficiency. Further, this laser window approach is not applicable to systems with multiple lasers.

Figure 2:
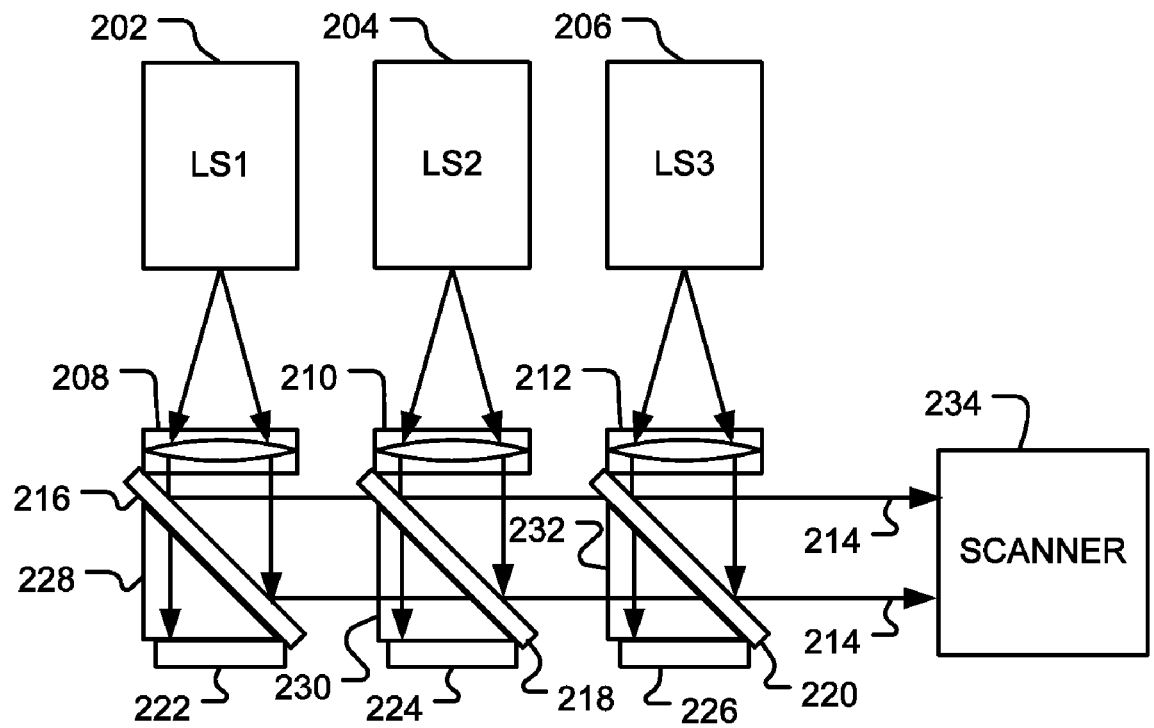
FIGS. 2 and 3 are diagrams of an illumination system with intensity control consistent with certain embodiments.

FIG. 2 is diagram of a multiple light source illumination system with intensity control consistent with certain embodiments. Referring to FIG. 2, the system 200 includes at least three light sources (202, 204 and 206). These may be lasers, for example, each producing light at a primary color wavelength. For example lasers that generate light at 440 nm, 532 nm and 635 nm wavelengths may be used. Other combinations of lasers may be used. In some applications, the light sources are chosen so that a combination of the light from the sources can produce white light. Referring again to FIG. 2, the light sources (202, 204, 206) produce emit light unidirectionally in three separate beams. The beams pass through optical elements (208, 210 and 212) and are combined into a collimated and co-linear beam 214 using dichroic mirrors 216, 218 and 220. As used herein, the terms collimated and co-linear are meant to include instances of substantially collimated and co-linear beams. Each dichroic mirror reflects one primary color wavelength and transmits other wavelengths. Thus, for example, the dichroic mirror 218 reflects light from light source 204 but transmits light from light source 202.

A dichroic mirror generally has a reflectivity of 95% or more at the targeted wavelength, but some light is transmitted. Photo-sensors 222, 224 and 226 (such as photodiodes) are positioned behind dichroic mirrors 216, 218 and 220, respectively and are oriented to detect the transmitted light. The intensity of the transmitted light is in direct proportion to the intensity of the primary light, and so the output from the photo-sensor provides an accurate signal for use in feedback control loop to control the laser intensity.

A dichroic mirror generally has a very high transmittance to light at primary wavelengths other than the target wavelength. Thus, for example, very little light from laser 202 reaches the photo-sensor 224 and there is little cross-talk in the measurements at the photo-diodes. In addition, the three beams are highly collimated, so there is very little cross-talk from scattered light.

Optionally, a prism structure (228, 230 and 232) may be used to provide a mechanical support for a dichroic mirror and an associated photodiode. For example, dichroic mirror 216 is mounted on one facet of prism structure 228, while photo-sensor 222 is mounted on another facet of prism structure 228.

Each photo-sensor may be designed to have maximum sensitivity at the target wavelength of the corresponding dichroic mirror. This further reduces cross-talk between the photo-sensors and enables highly reflective dichroic mirrors to be used. Photo sensors with wavelength sensitive responses are well known to those of ordinary skill in the art. In addition, the photo sensors may include wavelength filters.

The collimated beam 214 is passed to a scanner 234. Various compact scanners are known to those of ordinary skill in the art.

In one embodiment, semi-conductor lasers are used as light sources and Si-photodiodes are used as photo-sensors. Calculated signal to noise ratios are shown in Table 1.

TABLE 1

| | Laser Wavelength (nm) | | |
|---|---|---|---|
| | 660(red) | 532(green) | 440(blue) |
| Laser Power (mW) | 56 | 14 | 10 |
| PD sensitivity (A/W) | 0.40 | 0.27 | 0.15 |
| S/N at photodiode | 22400 | 3780 | 1500 |

Of the three primary lights, the Si-photodiodes are least sensitive to blue light. For blue light the sensitivity is in the region of 0.15 A/W. If the system generates light of at least 10 mW of optical power and the dichroic mirror permits 1.5% leakage, it is estimated that a signal to noise ratio of 1500 will be achieved. Thus, accurate monitoring of the light intensity is possible. It will be apparent to those of ordinary skill in the art that additional electronic circuitry could be used, if required, to enhance detection of even smaller laser powers. For example, the signal to noise ratio of the blue laser power could be improved in this manner.

The geometric arrangement shown in FIG. 2 make efficient use of space, since the photo-sensors are positioned in space behind the dichroic mirrors that would otherwise be unused.

The geometric arrangement results in improved efficiency compared to a system using back facet reflectivity (98% for mirrors versus 90% for back reflectivity). For example, for a red laser diode, the front reflectivity is 10% and the back reflectivity is 90%. If back monitoring is not needed, the back reflectivity can be 98% and the front reflectivity 10%. This makes the laser more efficient by decreasing the threshold current and increasing the slope efficiency.

Conventional feedback electronics (not shown in FIG. 2) may be used adjust the light source intensity dependent upon the signal from the corresponding photo-sensor.

Figure 3:
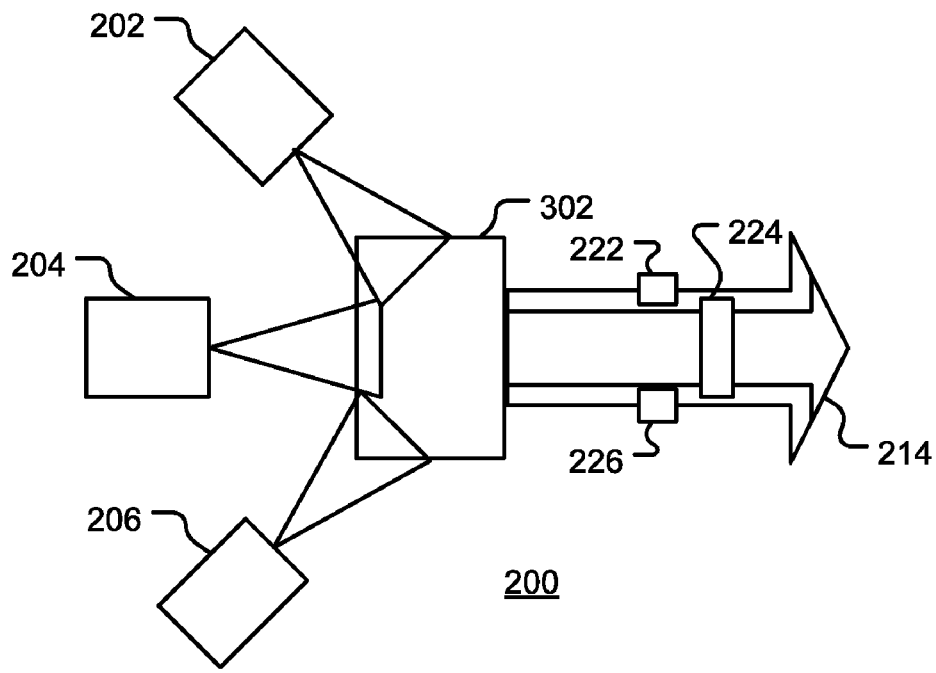

FIG. 3 is a diagram of a multiple light source illumination system with intensity control consistent with certain embodiments. Referring to FIG. 3, light sources 202, 204 and 206 generate light of different wavelengths that are combined in beam combiner 302. Various beam combiners are known to those of ordinary skill in the art, and include dichroic mirror combiners as described above. The output of beam combiner 302 is collimated beam 214. Tuned photo-sensors 222, 224 and 226 are positioned in the fringe of the beam 214 and are operable to sense light in the fringe of the beam. Each photo-sensor is tuned to be sensitive to light at wavelengths produced by one of the light sources.

Figure 4:
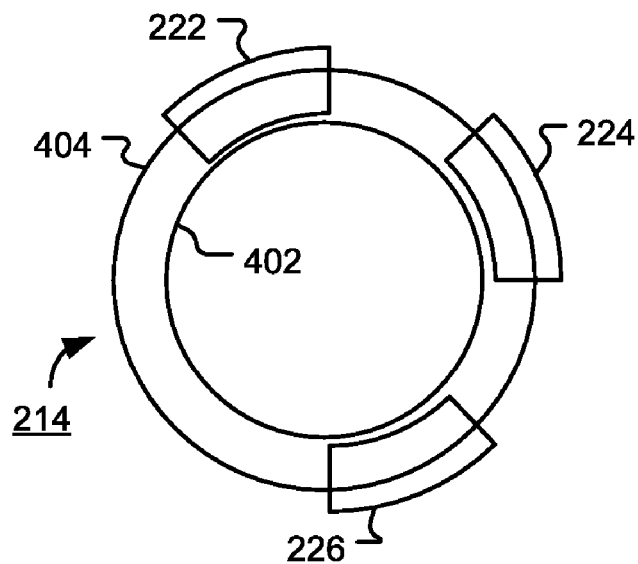
FIG. 4 shows photo-sensors located relative to a collimated beam consistent with certain embodiments.

FIG. 4 shows an exemplary cross section through the collimated laser beam 214. The beam has an inner region, inside the circle 402, in which the light has a high intensity, and an intermediate region, or fringe, bounded by the circles 402 and 404 where the light has a reduced, but still significant, intensity. Photo-sensors 222, 224 and 226 are placed in the fringe of the beam. Thus, the photo-sensors do not interfere with the high intensity region of the beam. Each photo-sensor is responsive to a different range of wavelengths. These wavelengths correspond to the wavelengths of one of the light sources, so each photo-sensor provides an electrical signal that can be used in a feedback loop to control one of the light sources.

Figure 5:
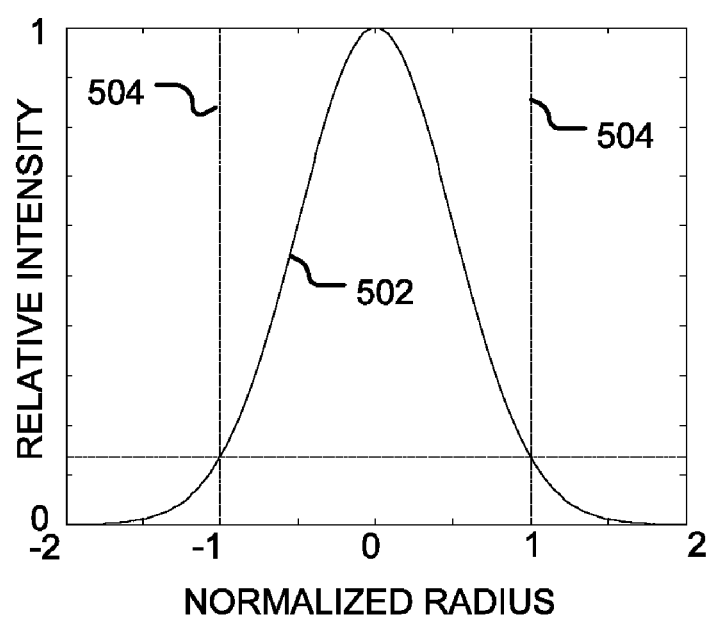
FIG. 5 is an exemplary cross-sectional plot of light intensity in a collimated laser beam.

FIG. 5 is a plot of the intensity of the collimated laser beam as a function of the normalized distance from the center of the beam. The intensity is plotted relative to the maximum intensity of the beam (which occurs at the center). The radius is normalized relative to the radius at which the intensity falls to $1/e^2$ of the maximum intensity. The plot shows, for example, that the photo-sensors can be placed at a position having normalized ratio one, and still detect a significant portion of the intensity. Further, there is little effect on the overall intensity of the collimated beam.

Figure 6:
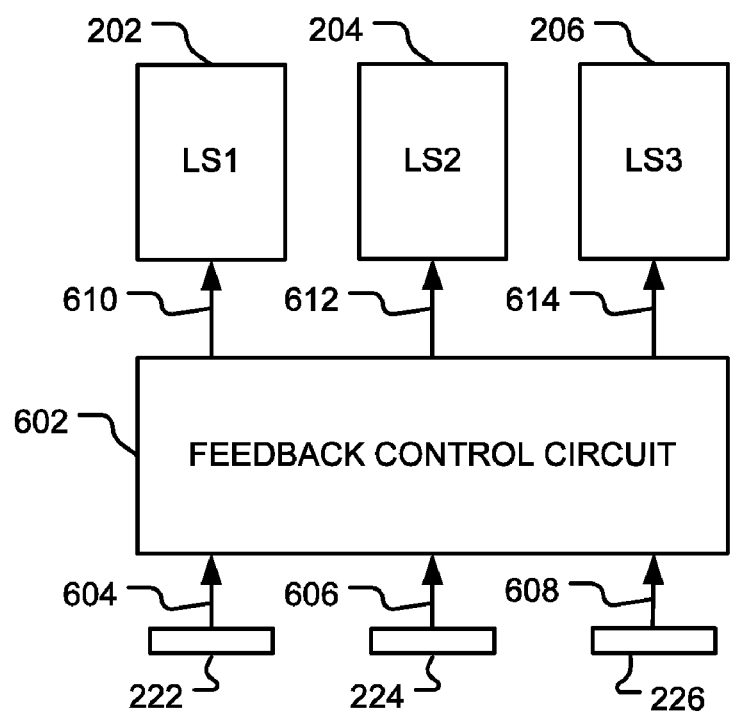
FIGS. 6 and 7 are diagrams of an illumination system consistent with certain

FIG. 6 is a diagram of an illumination system consistent with certain embodiments. The illumination system includes a first light source 202 for generating light at a first wavelength, a second light source 204 for generating light at a second wavelength and a third light source 206 for generating light at a third wavelength. The light sources are controlled by a feedback control circuit 602 that is responsive to photo-sensors 222, 224 and 226. The photo-sensor 222 produces a monitor signal 604 in response to light from the light source 202, the photo-sensor 224 produces a monitor signal 606 in response to light from the light source 204, and the photo-sensor 226 produces a monitor signal 608 in response to light from the light source 206. The feedback control circuit 602 generates control signals 610, 612 and 614 to control the intensities of light sources 202, 204 and 206, respectively. In one embodiment, the intensities are controlled to pre-set values. The sensitivity of the photo-sensor 222 to light from the light source 204 is greater than its sensitivity to light from the light source 204 and 206. This may be achieved either by positioning of the photo-sensor or by selecting the wavelength sensitivity of the photo-sensor.

In one embodiment, the feedback control circuit comprises three independent control circuits. In a further embodiment, signals from two or more photo-sensors may be combined to reduce cross-talk between the sensors, yielding a cross-coupled or multi-channel control circuit.

Figure 7:
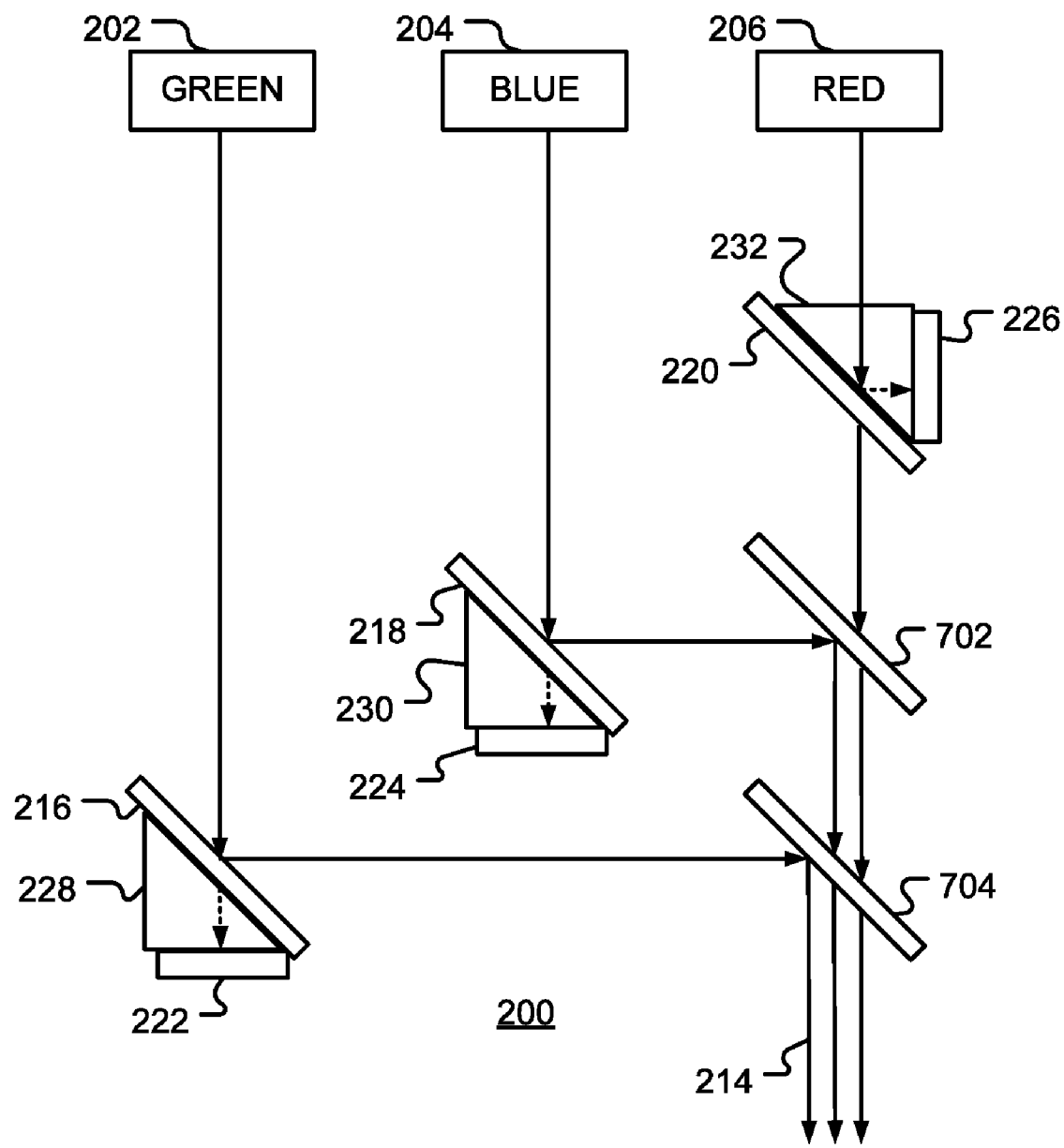

FIG. 7 is a diagram of a multiple light source illumination system with intensity control consistent with certain embodiments. Referring to FIG. 7, the system 200 includes at least three light sources (202, 204 and 206). These may be lasers, for example, each producing light at a primary color wavelength. For example lasers that generate light at 440 nm, 532 nm and 635 nm wavelengths may be used. Referring again to FIG. 7, the light sources (202, 204, 206) emit light unidirectionally in three separate beams. The beams are combined into a collimated and co-linear beam 214 using dichroic mirrors 216, 218, 220, 702 and 704. Dichroic mirrors 216 and 704 reflect substantially all light from source 202, while dichroic mirrors 218 and 702 reflect substantially all light from the source 204. Mirrors 220, 702 and 704 transmit substantially all light from source 206.

Photo-sensors 222 and 224 (such as photodiodes) are positioned behind dichroic mirrors 216 and 218, respectively and are oriented to detect the transmitted light. Photo-sensor 226 is positioned in front of mirror 220 and is oriented to detect light reflected from the mirror 220.

More generally, dichroic mirrors are used to direct the light from a light source, either by transmitting or reflecting substantially all of the light at a certain narrow band. When the light is transmitted, the photo-sensor can be placed on the same side of the mirror as the light source so as to collect the small amount of light not transmitted and not to interfere with the main beam. When the light is reflected by the mirror, the photo-sensor can be placed on the opposite side of the mirror from the light source so as to collect the small amount of light not reflected and not to interfere with the main beam. In both case, the sensor is place to receive light that is not directed along the main beam. That is, if the main beam emanates from one side of the mirror, the sensor is place on the other side to detect leaked light. It will be apparent to those of ordinary skill in the art that this approach can be used for other light directing means, such as prisms, and for other light combination configurations.

Optionally, a prism structure (228, 230 and 232) may be used to provide a mechanical support for a dichroic mirror and an associated photodiode. For example, dichroic mirror 216 is mounted on one facet of prism structure 228, while photo-sensor 222 is mounted on another facet of prism structure 228.

In a further embodiment, the dichroic mirror is formed as a mirror coating on a surface of the prism structure.

Each photo-sensor (222, 224 and 226) receives light substantially from only one light source. Hence there is very little cross talk between the sensors. The sensors may have the same or similar sensitivities, or may be tuned to be more sensitive to light from the associated light source.

For applications where full color is not required, the illumination system may use only two light sources and two sensors. In FIG. 7, for example, any one of the light sources could be omitted. However, omitting light source 202 or 204 eliminates two dichroic mirrors. For full color applications, three or more light sources may be used.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. An illumination system comprising:
    a first light source operable to respond to a first feedback control circuit and generate light at a first wavelength;
    a second light source operable to respond to a second feedback control circuit and generate light at a second wavelength;
    a beam combiner operable to combine light from the first and second light sources and produce a substantially co-linear and collimated beam;
    a first photo-sensor operable to provide a signal to the first feedback control circuit in response to light from the first light source; and
    a second photo-sensor operable to provide a signal to the second feedback control circuit in response to light from the second light source;
    wherein the sensitivity of the first photo-sensor to light at the first wavelength is greater than the sensitivity of the first photo-sensor to light at the second wavelength.

2. An illumination system in accordance with claim 1, wherein the first and second light sources comprise lasers.

3. An illumination system in accordance with claim 1, wherein the beam combiner comprises:
    a first dichroic mirror configured to reflect light from the first light source along a beam path;
    a second dichroic mirror configured to reflect light from the second light source along the beam path;
    wherein the first photo-sensor is positioned to receive light from the first light source that is transmitted through the first dichroic mirror and the second photo-sensor is positioned to receive light from the second light source that is transmitted through the second dichroic mirror.

4. An illumination system in accordance with claim 3, wherein the first dichroic mirror located on a first facet of a prism structure and the first photo-sensor is positioned on a second facet of the prism structure.

5. An illumination system in accordance with claim 3, further comprising a first optical element located between the first light source and the first dichroic mirror and operable to collimate light from the first light source.

6. An illumination system in accordance with claim 1, wherein the first and second photo-sensors are located to sense light in the fringe of the collimated beam.

7. A portable electronic device comprising:
    the illumination system of claim 1; and
    a scanner operable to receive the substantially collimated beam and produce a projected image.

8. An illumination system comprising:
    a first light source operable to respond to a first feedback control circuit and generate light at a first wavelength;
    a second light source operable to respond to a second feedback control circuit and generate light at a second wavelength;
    a first photo-sensor operable to provide a signal to the first feedback control circuit in response to light from the first light source;
    a second photo-sensor operable to provide a signal to the second feedback control circuit in response to light from the second light source;
    a first dichroic mirror configured to direct light from the first light source along a beam path emanating from a first face of the first dichroic mirror;
    a second dichroic mirror configured to direct light from the second light source along a beam path emanating from a first face of the second dichroic mirror in order to be combined with light from the first light source;
    wherein the first photo-sensor is positioned to receive light from the first light source emanating from a second face of the first dichroic mirror and the second photo-sensor is positioned to receive light from the second light source emanating from a second face of the second dichroic mirror.

9. An illumination system in accordance with claim 8, wherein the first and second light sources are lasers.

10. An illumination system in accordance with claim 8, wherein the first dichroic mirror located on a first facet of a prism structure and the first photo-sensor is positioned on a second facet of the prism structure.

11. An illumination system in accordance with claim 8, further comprising a scanner operable to receive and project the collimated beam.

12. A method for generating light from a plurality of light sources, the method comprising:
    for each light source:
        generating light from the light source;
        reflecting a first portion of the light from a dichroic mirror to combine with light from the other light sources of the plurality of light sources and form a substantially collimated beam;
        transmitting a second portion of the light through the dichroic mirror;

sensing the second portion of light; and
controlling the intensity of the light source dependent upon the sensed second portion of light.

13. A method in accordance with claim 12, wherein sensing the second portion of light comprises sensing the intensity of the light using a photo-diode.

14. A method in accordance with claim 12, wherein sensing the second portion of light comprises sensing the second portion of light using a photo-sensor that is sensitive substantially only to light of the wavelength generated by the corresponding light source.

15. A method for generating light from a plurality of light sources of different wavelengths, the method comprising:
   combining light from the plurality of light sources to form a substantially collimated beam having a plurality of wavelength;
   for each light source:
      sensing light in the fringe of the substantially collimated beam to produce a monitor signal dependent upon the intensity of light at the wavelength produced by the light source; and
      controlling the intensity of the light source dependent upon the monitor signal.

16. A method in accordance with claim 15, wherein the plurality of light sources comprise red, green and blue laser light sources.

17. A method in accordance with claim 16, wherein sensing light in the fringe of the substantially collimated beam for red, green and blue laser light sources comprises sensing the light using photo-diodes sensitive to red, green and blue light, respectively.

18. A method in accordance with claim 15, further comprising passing the substantially collimated beam to a scanner.

19. An illumination system comprising:
   a first light generating means for generating light at a first wavelength;
   a second generating means for generating light at a second wavelength;
   a third generating means for generating light at a third wavelength;
   a beam combining means for combining light from the first, second and third light generating means to form a combined beam;
   a first light sensing means sensing light generated by the first light generating means;
   a second light sensing means sensing light generated by the second light generating means;
   a third light sensing means sensing light generated by the third light generating means;
   a feedback control means, for controlling the intensity of the first, second and third light generating means in response to signals from the first, second and third light sensing means;
   wherein the first light sensing means is configured to be sensitive to light at the first wavelength and the second light sensing means is configured to be sensitive to light at the second wavelength.

20. An illumination system in accordance with claim 19, wherein the beam combining means comprises:
   a first light directing means for directing a portion of the first light into the combined beam;
   a second light directing means for directing a portion of the second light into the combined beam;
   a third light directing means for directing a portion of the third light into the combined beam;
   wherein the first, second and third light sensing means are located to receive light from the first, second and third light directing means, respectively, that is not directed into the combined beam.

21. An illumination system in accordance with claim 19, wherein the first, second and third light sensing means are located in the beam combining means.

* * * * *